United States Patent
Challener

(10) Patent No.: US 7,242,768 B2
(45) Date of Patent: Jul. 10, 2007

(54) SUPER SECURE MIGRATABLE KEYS IN TCPA

(75) Inventor: David Carroll Challener, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 818 days.

(21) Appl. No.: 10/046,437

(22) Filed: Jan. 14, 2002

(65) Prior Publication Data

US 2003/0133575 A1 Jul. 17, 2003

(51) Int. Cl.
*H04L 9/00* (2006.01)
(52) U.S. Cl. .............................. 380/44; 380/45; 380/43
(58) Field of Classification Search ................ 380/268, 380/43, 278, 44, 45
See application file for complete search history.

(56) References Cited

U.S. PATENT DOCUMENTS

| 4,802,217 | A |   | 1/1989  | Michener           |         |
|-----------|---|---|---------|--------------------|---------|
| 5,592,553 | A |   | 1/1997  | Guski et al.       |         |
| 5,606,615 | A |   | 2/1997  | Lapointe et al.    |         |
| 5,677,952 | A |   | 10/1997 | Blakley, III et al.|         |
| 5,850,443 | A | * | 12/1998 | Van Oorschot et al.| 380/285 |
| 5,953,422 | A |   | 9/1999  | Angelo et al.      |         |
| 6,052,469 | A |   | 4/2000  | Johnson et al.     |         |
| 6,061,799 | A | * | 5/2000  | Eldridge et al.    | 713/202 |
| 6,105,133 | A |   | 8/2000  | Fielder et al.     |         |
| 6,212,635 | B1|   | 4/2001  | Reardon            |         |

FOREIGN PATENT DOCUMENTS

JP 4360438 12/1992

OTHER PUBLICATIONS

Yan, Jianxin et al., "The Memorability and Security of Passwords—Some Empirical Results," University of Cambridge Technical Report, No. 500, Sep. 2000, pp. 1-11.

* cited by examiner

*Primary Examiner*—Kambiz Zand
*Assistant Examiner*—Peter Poltorak
(74) *Attorney, Agent, or Firm*—Sawyer Law Group LLP

(57) ABSTRACT

A method for providing security with a secure chip, includes: creating a migratable keyblob using a first random number, where the migratable keyblob contains a key; wrapping the migratable keyblob with a public key of the key's parent key; encrypting the first random number with a pass phrase for a user of the key; storing the encrypted first random number; and migrating the migratable keyblob from the computer to itself. If the private key of the secure chip is stolen, the thief can only unwrap keys which are ancestors of the key in the migratable keyblob. To obtain the key in the migratable keyblob, the random number used to create it is required. However, the pass phrase of the user is required to decrypt it. This increases the security of the key stored in the migratable keyblob and its children keys.

18 Claims, 5 Drawing Sheets

SUPER SECURE MIGRATABLE KEYS IN TCPA

FIELD OF THE INVENTION

The present invention relates to security in computer networks, and more particularly to protecting root keys in secure chips, in the computer networks.

BACKGROUND OF THE INVENTION

Secure chips which follow the Trusted Computing Platform Alliance (TCPA) protocols are well known in the art. In the TCPA specification, a "secure chip" is a Trusted Platform Module (TPM). Typically, the TPM resides in a client computer system in a computer network. Among other functions, the TPM generates encryption keys in the form of public/private key pairs for the client to be used on the network. When the keys are not in use, they are stored outside of the TPM in a secure manner in a "daisy chain" fashion.

FIG. 1 illustrates a conventional secure chip key chain. Assume that the secure chip 102 is a TPM. The TPM 102 has its own root key 104. The root key 104 is the mechanism which allows the storage of information by a TPM. The root key 104 comprises a public/private key pair for the TPM 102. The TPM 102 generates more keys, such as keys 106, for the network. At least one of these keys 106 is a migratable key. Each of these keys 106 comprise a public/private key pair. Each of these keys 106 is wrapped using the TPM's 102 public key. The TPM 102 can then generate children keys 108 and wrap them in the key's 106 public key. Other keys 110 may be generated and wrapped in the key's 108 public key. Thus, the chain comprises a child key 110, which is wrapped in the public key of the parent key 108; the parent key 108, which is wrapped in the public key of the grandparent key 106; and the grandparent key 106, which is wrapped in the public key of the TPM 102.

Keys can be of two types according to the TCPA specification: migratable and non-migratable. Migratable keys are particularly relevant to the present invention, and thus only they will be described here. The TCPA specification contains two commands for migrating keys from one TPM to another. The first command is a simple re-wrap command, where a user's key is loaded into a TPM, unwrapped with its parent's key and then re-wrapped with another parent's key. This command can be used for migrating the user's key from one computer system to another during a computer upgrade. The second command is used for storing the user's key with a third party in case of hardware failure. For the second command, it is not known what the parent key of the replacement system will be during the storage, so a third party's public key is used for wrapping.

For the second command, if the third party's key may not be trusted, additional safeguards are provided. Before the key is wrapped, an optimal asymmetric encryption padding (OAEP) is applied and a random number, R, XOR'ed with the result before the final wrapping. This provides protection against the third party using his private key to unwrap the user's key. When the user's key is recalled from the third party, the user provides a public key (associated with the new TPM) to the third party in which to re-wrap the user's key, and then inserts the user's key wrapped with the new TPM's key along with R. The TPM then unwraps the final wrapping, XOR's the result with R, reverses the OAEP and hence recovers the user's key. This key is then loaded into the new TPM. The new TPM re-wraps the key in a normal way, and the re-wrapped key is stored on the hard disk.

However, the private key of the root key 104 in the secure chip 102 may be read by peeling the TPM and examining the hardware. Once the root key 104 is obtained, it may be used to unwrap all of the grandparent keys 106 wrapped with the root key's public key. Having access to the grandparent keys 106 in turn allows the unwrapping of all of the parent keys 108, and then the child keys 110. This results in a serious security breach.

Accordingly, there exists a need for a method for providing improved security with a secure chip. The present invention addresses such a need.

SUMMARY OF THE INVENTION

A method for providing security with a secure chip, includes: creating a migratable keyblob using a first random number, where the migratable keyblob contains a key; wrapping the migratable keyblob with a public key of the key's parent key; encrypting the first random number with a pass phrase for a user of the key; storing the encrypted first random number; and migrating the migratable keyblob from the computer to itself. If the private key of the secure chip is stolen, the thief can only unwrap keys which are ancestors of the key in the migratable keyblob. To obtain the key in the migratable keyblob, the random number used to create it is required. However, the pass phrase of the user is required to decrypt it. This increases the security of the key stored in the migratable keyblob and its children keys.

DETAILED DESCRIPTION

The present invention provides a method and system for providing improved security with a secure chip. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 5 in conjunction with the discussion below.

Figure 1:
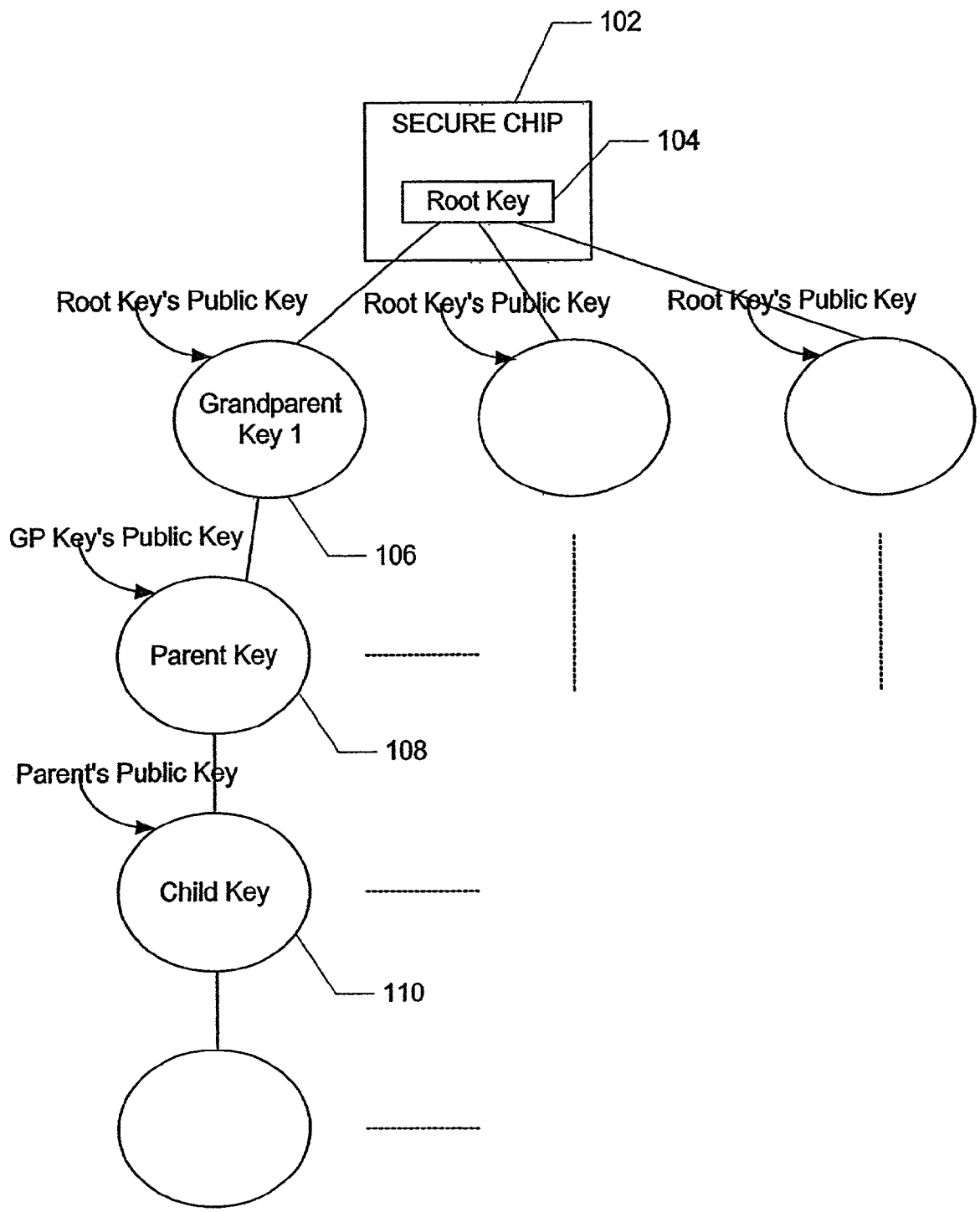
FIG. 1 illustrates a conventional secure chip key chain.
Figure 2:
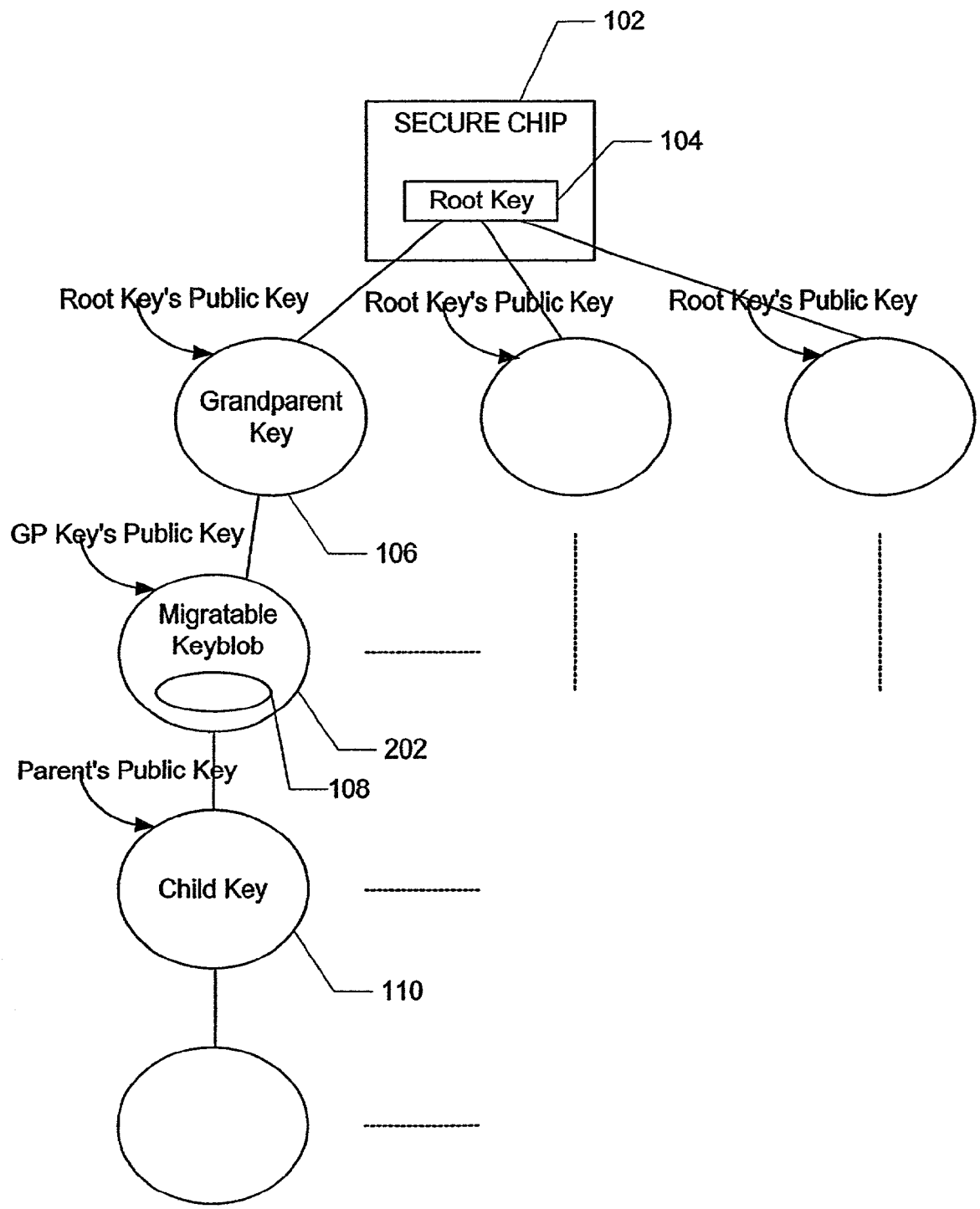
FIG. 2 illustrates a key chain created by a preferred embodiment of the method for improved security with a secure chip in accordance with the present invention.

FIG. 2 illustrates a key chain created by a preferred embodiment of the method for improved security with a secure chip in accordance with the present invention. In the preferred embodiment, the secure chip 102 stores one of the keys in the secure chip key chain in a migratable keyblob 202. For example, assume that a user of the parent key 108 desires improved security for the parent key 108 and its children keys 110. The parent key 108 is stored in a migratable keyblob 202 by scrambling the parent key 108 with an optimal asymmetric encryption padding (OAEP). The OAEP is well known in the art. The OAEP is then XOR'ed with a random number to create the migratable keyblob 202. The migratable keyblob 202 is then wrapped in the grandparent key's public key. With the present invention, the random number used to create the migratable keyblob 202 is generated by the secure chip's random number generator (not shown).

To use the parent key 108, the secure chip 102 unwraps the migratable keyblob 202 using its private key. To decrypt the migratable keyblob 202, the random number used to encrypt it must be available to the secure chip 102. With this random number, the secure chip 102 can unscramble the migratable keyblob 202 to obtain the parent key 108. However, the random number is typically many bits long, too long for the user to remember, and storing the random number on a disk with the secure chip 102 does not provide adequate security. To secure this random number, it too is encrypted using the pass phrase created by the user. The encrypted random number is then stored on the system. Thus, to obtain the parent key 108, the user's pass phrase is required. The pass phrase is used to decrypt the random number. This random number is then used by the secure chip 102 to obtain the parent key 108. Therefore, even if the secure chip's root key is discovered by peeling the chip 102, the parent key 108 stored in the migratable keyblob 202 is still not assessable without the pass phrase. If the migratable keyblob 202 cannot be decrypted, then the key's children keys 110 are not assessable either. This increases the security of the secure chip in that portion of the secure chip's key chain.

Figure 3:
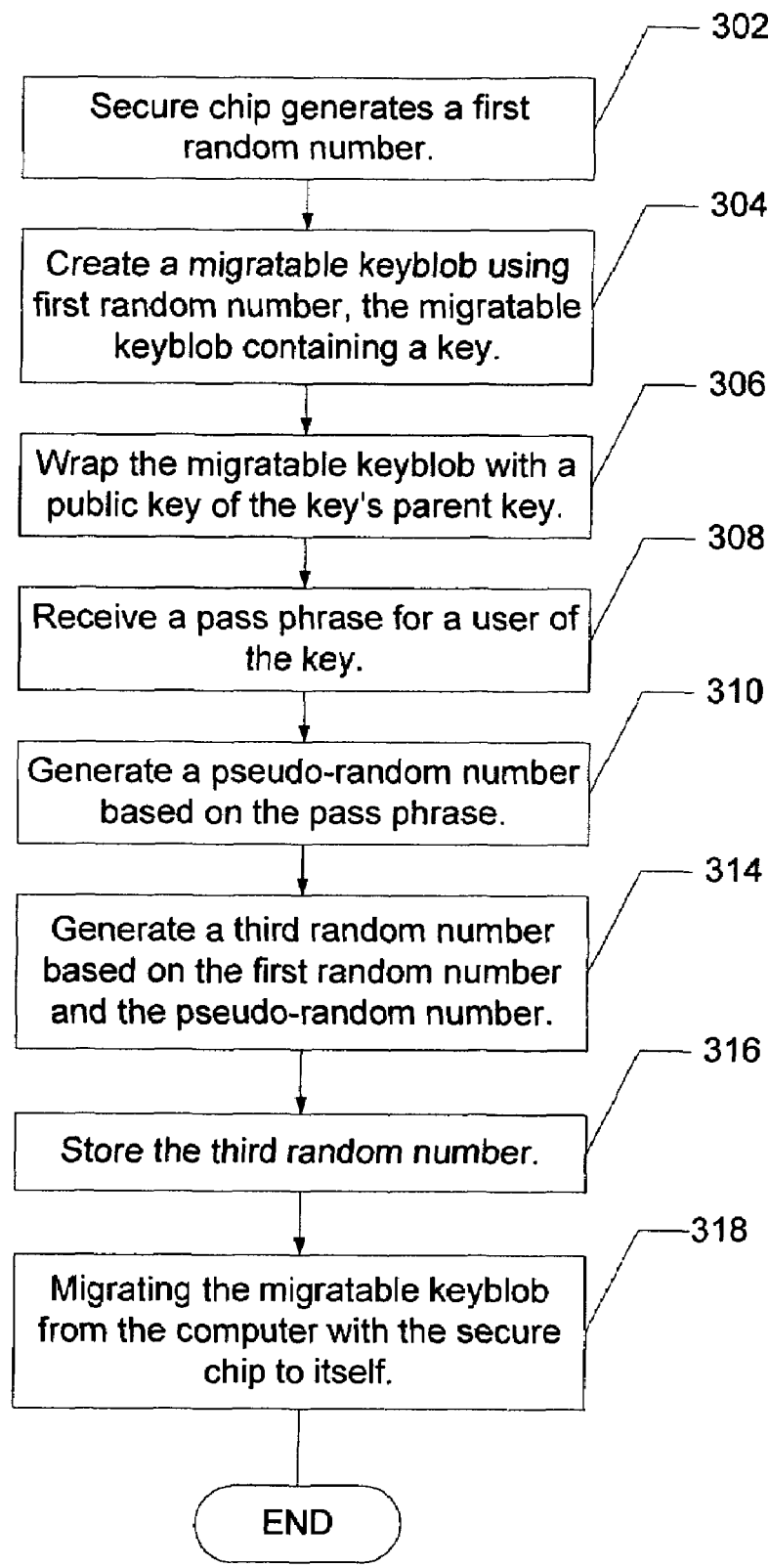
FIG. 3 is a flowchart illustrating a preferred embodiment of a method for improved security with a secure chip in accordance with the present invention.

FIG. 3 is a flowchart illustrating a preferred embodiment of a method for improved security with a secure chip in accordance with the present invention. First, the secure chip 102 generates a first random number, via step 302. The first random number is used to create a migratable keyblob 202, via step 304. The migratable keyblob 202 contains a key, such as the parent key 108. The secure chip 102 then wraps the migratable keyblob 202 with the public key of the key's parent key, via step 306, which is the public key of the grandparent key 106. The secure chip 102 receives a pass phrase for the user of the key 108, via step 308. The secure chip 102 then generates a pseudo random number based on the pass phrase, via step 310. Next, a third random number is generated based on the first random number and the pseudo random number, via step 314. This third random number is stored, via step 316. The migratable keyblob 202 is then migrated from the computer on which the secure chip 102 resides to itself, via step 318. In the preferred embodiment, the method is performed by a software residing on a disk in the computer on which the secure chip 102 also resides.

In this manner, if the root key 104 is somehow stolen, the thief can only unwrap keys in the key chain which are ancestors of the key stored in the migratable keyblob 202. To obtain the key in the migratable keyblob 202, the random number used to create the migratable keyblob 202 is required. This random number is stored encrypted such that the pass phrase of the user of the key is required to decrypt it. This increases the security of the key stored in the migratable keyblob 202. Since the key in the migratable keyblob 202 cannot be obtained, its children keys 110 also cannot be obtained. Thus, the method in accordance with the present invention increases the security of keys in this portion of the key chain.

Figure 4:
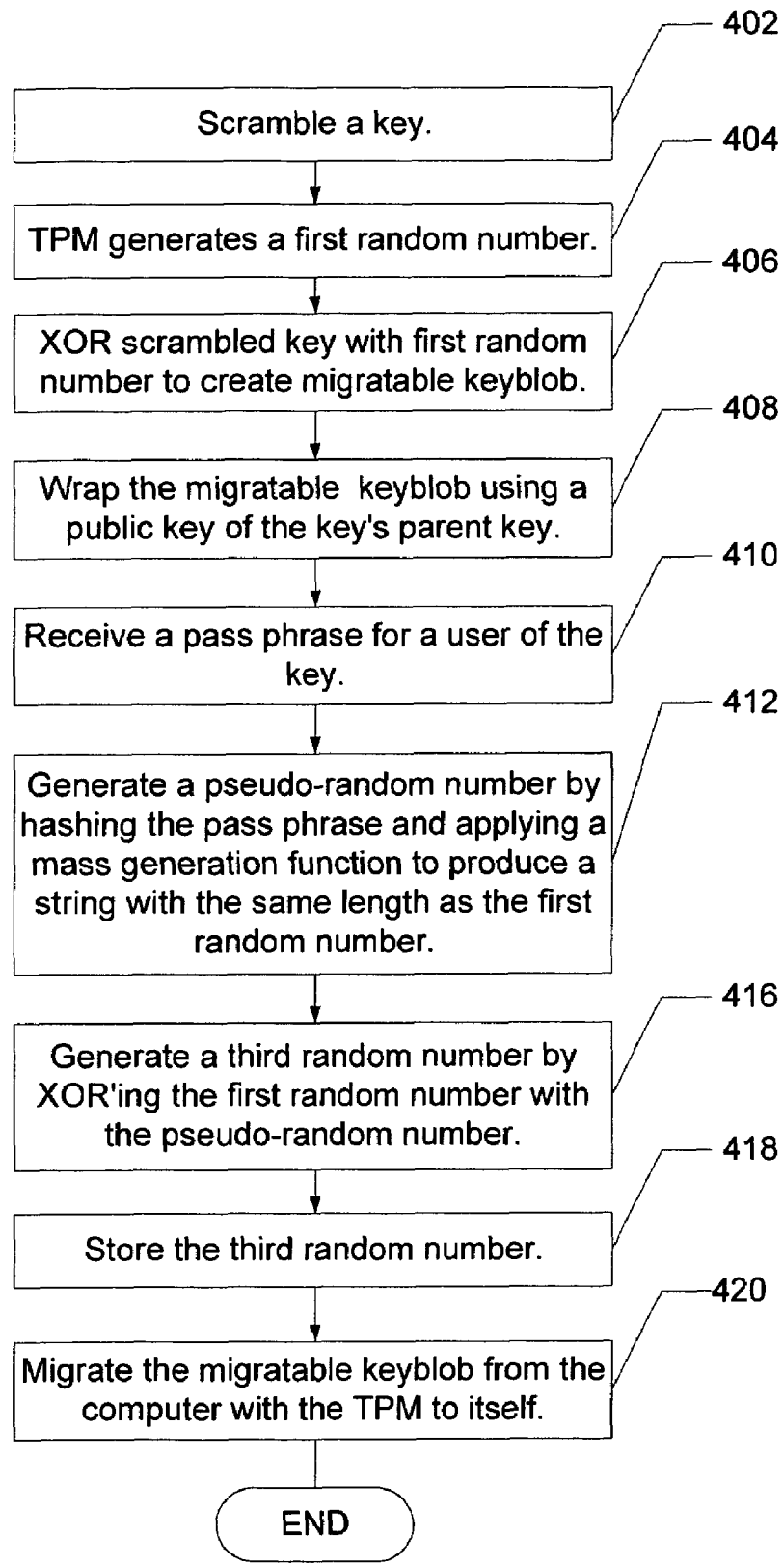
FIG. 4 is a flowchart illustrating in more detail the preferred embodiment of the method for improved security with a secure chip in accordance with the present invention.

FIG. 4 is a flowchart illustrating in more detail the preferred embodiment of the method for improved security with a secure chip in accordance with the present invention. Assume that the secure chip 102 is a Trusted Platform Module (TPM) using the Trusted Computing Platform Alliance (TCPA) protocol. First, a key, such as the parent key 108, is scrambled, via step 402. Next, the random number generator of the TPM 102 generates a first random number, via step 404. The first random number is then XOR'ed with the scrambled parent key 108 to create the migratable keyblob 202, via step 406. The TPM 102 wraps the migratable keyblob 202 with the public key of the parent key's parent key, i.e., the public key of the grandparent key 106, via step 408. Also, a pass phrase for a user of the parent key 108 is received, via step 410. A pseudo random number is generated by hashing the user's pass phrase and, applying a mask generation function (MGF) to produce a string having the same length as the first random number, via step 414. MGF's are well known in the art. The first random number and the pseudo random number are XOR'ed to generate a third random number, via step 416. This third random number is stored, via step 418. The migratable keyblob 202 is migrated from the computer with the TPM to itself, via step 420.

Figure 5:
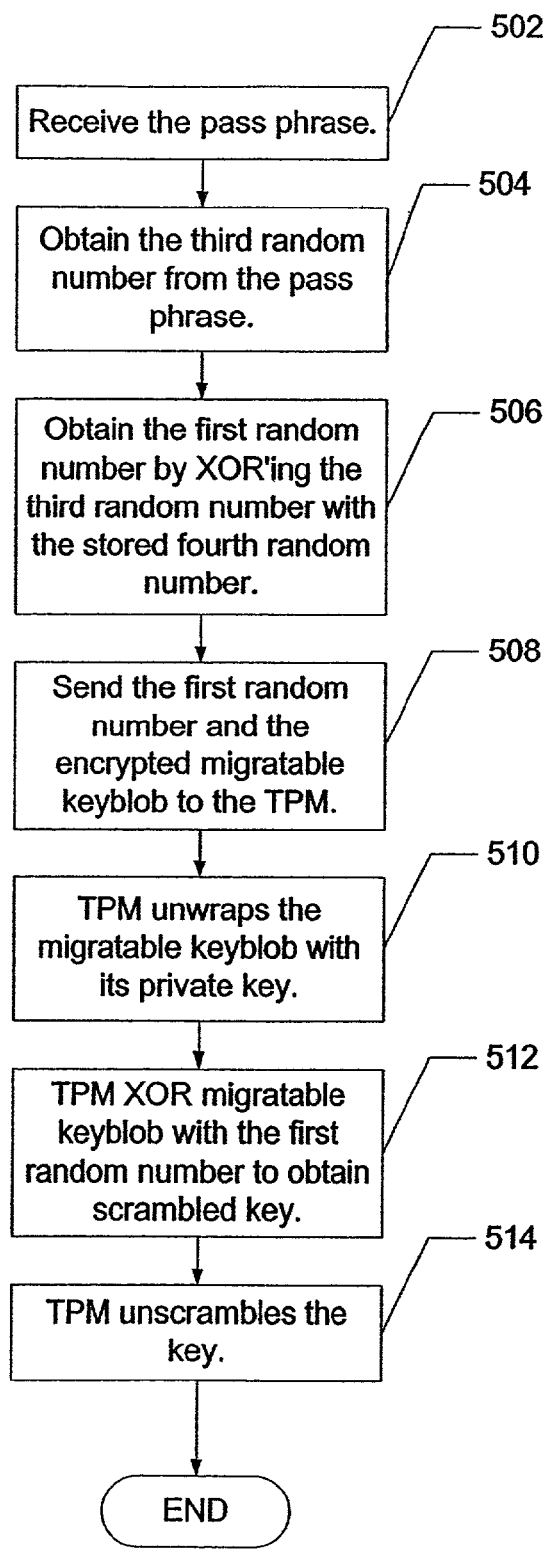
FIG. 5 is a flowchart illustrating how a key secured with the method in accordance with the present invention is obtained.

To use the parent key 108, the user enters his/her pass phrase. FIG. 5 is a flowchart illustrating how a key secured with the method in accordance with the present invention is obtained. First, the user's pass phrase is received, via step 502. The pseudo random number is then obtained from hashing the pass phrase and applying the MGF, via step 504. The first random number is then obtained by XOR'ing the pseudo random number with the stored third random number, via step 506. The first (TPM's) random number and the encrypted migratable keyblob 202 are then sent to the TPM 102, via step 508. The TPM 102 unwraps the encrypted migratable keyblob 202 using its private key, via step 510. The TPM 102 XOR's the migratable keyblob 202 with the first random number to obtain the scrambled parent key 108, via step 512. The TPM 102 can then unscramble the parent key 108, via step 514. Once unscrambled, the key 108 may be used. While with a conventional migratable keyblob, the recovered key 10 is rewrapped into a normal blob and stored in persistent memory, this does not happen with the recovered key 108 in accordance with the present invention. The returned normal blob is discarded instead.

Alternatively, if the security provided by the migratable keyblob is not required, then a non-migratable keyblob can be used. A random number of equal length to the non-migratable keyblob can be provided by the TPM 102 and XOR'ed with the non-migratable keyblob. The results is stored. The random number is then hidden by encrypting it with a key derived from the user's pass phrase.

A method for providing improved security with a secure chip has been disclosed. The method stores a key in the secure chip's key chain within a migratable keyblob. The random number used to create the migratable keyblob is stored encrypted using a pass phrase of a user of the key. If the root key of the secure chip is somehow stolen, the thief can only unwrap keys in the key chain which are ancestors of the key stored in the migratable keyblob. To obtain the key in the migratable keyblob, the random number used to create it is required. However, the pass phrase of the user is required to decrypt it. This increases the security of the key stored in the migratable keyblob and its children keys.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for securely storing a key using a secure chip associated with a computer system, the method comprising:

creating a migratable keyblob, the migratable keyblob securely storing a key having been encrypted based at least in part on use of a first random number;

receiving user input creating a pass phrase to encrypt the first random number; and encrypting the first random number using the pass phrase to prevent unauthorized usage of the first random number to decrypt and recover the key securely stored in the migratable keyblob, wherein encrypting the first random number using the pass phrase comprises, generating a pseudo-random number based on the pass phrase, the pseudo-random number having a same length as the first random number; and XORing the first random number with the pseudo-random number to produce a string representing the encrypted first random number.

2. The method of claim 1, wherein generating a pseudo-random number based on the pass phrase includes:

hashing the pass phrase; and applying a mask generation function to the hashed pass phrase.

3. The method of claim 1, further comprising storing the string representing the encrypted first random number.

4. The method of claim 3, wherein the storing the string representing the encrypted first random number includes storing the string on a hard disk associated with the computer system.

5. The method of claim 3, further comprising:

recovering the key securely stored in the migratable keyblob including, receiving user input entering the pass phrase;

regenerating the pseudo-random number having a same length as the first random number based on the received pass phrase;

reproducing the first random number by XORing the regenerated pseudo-random number with the string representing the encrypted first random number; and using the reproduced first random number to decrypt and recover the key securely stored in the migratable keyblob.

6. The method of claim 1, wherein the secure chip is a Trusted Platform Module (TPM) chip in accordance with Trusted Computing Platform Alliance (TCPA) protocols.

7. The method of claim 6, wherein the first random number is generated by the Trusted Platform Module (TPM) chip.

8. A computer readable medium with program instructions tangibly stored thereon for securely storing a key using a secure chip associated with a computer system, the computer readable medium comprising instructions for:

creating a migratable keyblob, the migratable keyblob securely storing a key having been encrypted based at least in part on use of a first random number;

receiving user input creating a pass phrase to encrypt the first random number; and encrypting the first random number using the pass phrase to prevent unauthorized usage of the first random number to decrypt and recover the key securely stored in the migratable keyblob, wherein the instructions for encrypting the first random number using the pass phrase comprise instructions for, generating a pseudo-random number based on the pass phrase, the pseudo-random number having a same length as the first random number; and XORing the first random number with the pseudo-random number to produce a string representing the encrypted first random number.

9. The computer readable medium of claim 8, wherein the instructions for generating a pseudo-random number based on the pass phrase include instructions for:

hashing the pass phrase; and applying a mask generation function to the hashed pass phrase.

10. The computer readable medium of claim 8, further comprising instructions for storing the string representing the encrypted first random number.

11. The computer readable medium of claim 10, wherein the instructions for storing the string representing the encrypted first random number include instructions for storing the string on a hard disk associated with the computer system.

12. The computer readable medium of claim 10, further comprising instructions for:

recovering the key securely stored in the migratable keyblob including, receiving user input entering the pass phrase;

regenerating the pseudo-random number having a same length as the first random number based on the received pass phrase;

reproducing the first random number by XORing the regenerated pseudo-random number with the string representing the encrypted first random number; and using the reproduced first random number to decrypt and recover the key securely stored in the migratable keyblob.

13. The computer readable medium of claim 8, wherein the secure chip is a Trusted Platform Module (TPM) chip in accordance with Trusted Computing Platform Alliance (TCPA) protocols.

14. The computer readable medium of claim 13, wherein the first random number is generated by the Trusted Platform Module (TPM) chip.

15. A computer system comprising:

a secure chip to generate a first random number;

first circuitry coupled to the secure chip, the first circuitry operable to create a migratable keyblob, the migratable keyblob securely storing a key having been encrypted based at least in part on use of the first random number;

second circuitry couple to the first circuitry, the second circuitry to receive user input creating a pass phrase to encrypt the first random number; and third circuitry coupled to the second circuitry, the third circuitry to encrypt the first random number using the pass phrase to prevent unauthorized usage of the first random number to decrypt and recover the key securely stored in the migratable keyblob, the third circuitry encrypting the random number using the pass phrase by,
  generating a pseudo-random number based on the pass phrase, the pseudo-random number having a same length as the first random number; and
  XORing the first random number with the pseudo-random number to produce a string representing the encrypted first random number.

16. The computer system of claim 15, further comprising a hard disk to store the encrypted first random number.

17. The computer system of claim 15, wherein the second circuitry is further operable to receive user input entering the pass phrase, and the computer system further comprises:

fourth circuitry coupled to the second circuitry, the fourth circuitry to decrypt the encrypted first random number and recover the first random number, wherein the secure chip is operable to receive the migration keyblob and the recovered first random number to decrypt and recover the key securely stored in the migratable keyblob.

18. The computer system of claim 17, wherein the secure chip comprises a Trusted Platform Module (TPM) chip in accordance with Trusted Computing Platform Alliance (TCPA) protocols.

* * * * *